Patented Aug. 6, 1940

2,210,254

UNITED STATES PATENT OFFICE 2,210,254

MINERAL COMPOSITION FOR USE IN GLASS MANUFACTURE

Charles H. Peddrick, Jr., Northville, N. Y., assignor to Feldspathic Research Corporation, New York, N. Y., a corporation of Delaware No Drawing. Application June 9, 1936, Serial No. 84,293

6 Claims. (Cl. 106—36.1)

This invention relates to a mineral composition for introducing alumina into glass and to a process of utilizing the same. A principal object of the invention is to make a relatively cheap raw material available for the above purpose.

It is recognized by the glass industry that the presence of alumina in glass produces characteristics and properties which result in an improved product. Feldspar has been commonly used as a source of this alumina because of its availability and because of its composition which makes it particularly suitable for use in the glass batch.

Since feldspar is a relatively fusible mineral and is considered a natural glass, it blends very readily in a glass tank with other glass-making ingredients, and at the same time it introduces the alumina in a form which is already combined with alkalies and silica. The alumina is thus put in, in a diluted form capable of being readily mixed with the other batch ingredients, thereby distributing the alumina throughout the glass before and during the melting process and preventing accumulations of alumina which might give rise to cords or other results of non-homogeneity.

Since feldspar is used in glass principally because it is a source of alumina, it is of utmost importance that the alumina content of the feldspar be as high as possible. However, the supply of high grade feldspars with an alumina content of 18% or above is rather limited. Hence it is highly desirable to enhance the alumina content of low grade feldspars to a somewhat higher figure such as 20% or 21% to render them suitable for the above purpose.

In accordance with the present invention I have found that pyrophyllite, represented by the formula $Al_2O_3.4SiO_2.H_2O$, possesses many characteristics which are required for glass manufacture. This mineral is found, mixed with some feldspar and quartz, in a very clean condition, having an iron content as low as that of the usual feldspar commercially mined and ground. Furthermore, the alumina content of this mineral is higher than any available feldspar, and since high grade pyrophyllite can be produced at a cost much lower than feldspar, the use of this mineral as a glass batch ingredient becomes highly desirable. I have found that this mineral can be used in glass batches by mixing it thoroughly with the natural feldspar in various proportions to give a desirable alumina content and melting point. Compositions containing from ⅓ to ⅔ feldspar produce desirable results in a glass batch.

It would be entirely feasible to use pyrophyllite alone as a complete substitution for feldspar in glass batches, but this is usually not necessary since a suitable concentration of alumina can be obtained by mixing pyrophyllite with low-grade feldspar without using the extremely high concentration of alumina that would be found in the pyrophyllite alone.

Tabulated below are compositions of feldspar, pyrophyllite, a mixture A containing ⅔ feldspar and ⅓ pyrophyllite, and a mixture B containing ⅔ pyrophyllite and ⅓ feldspar. This will be referred to later by the designations "mixture A" and "mixture B" respectively.

*Composition of feldspar, pyrophyllite, and mixtures*

| | Feldspar | Pyrophyllite | Mixture A<br>⅔ feldspar<br>⅓ pyrophyllite | Mixture B<br>⅓ feldspar<br>⅔ pyrophyllite |
|---|---|---|---|---|
| $SiO_2$ | 69.6 | 72.7 | 70.6 | 71.7 |
| $Al_2O_3$ | 17.5 | 22.7 | 19.2 | 21.0 |
| $Fe_2O_3$ | .1 | .1 | .1 | .1 |
| $CaO$ | .8 | .2 | .6 | .4 |
| $K_2O$ | 8.4 | | 5.6 | 2.8 |
| $Na_2O$ | 3.4 | .3 | 2.4 | 1.3 |
| Loss | .2 | 4.0 | 1.5 | 2.7 |
| | 100.0 | 100.0 | 100.0 | 100.0 |

It is understood that the composition of the feldspar given above is merely typical of a relatively low-grade feldspar from the standpoint of alumina content. Similarly, the composition of the pyrophyllite is that of a representative sample of material as it is commercially mined and ground. Other feldspar compositions could be used, and also other pyrophyllite compositions, in any suitable proportion, without departing from the scope and spirit of the invention.

A typical container glass using feldspar in the batch may be described as follows:

*Typical container glass, using feldspar*

| Composition | | Batch | |
|---|---|---|---|
| | Percent | | Pounds |
| $SiO_2$ | 73.0 | Sand | 1,000 |
| Alkali ($Na_2O K_2O$) | 17.0 | Soda ash | 400 |
| Lime (CaOMgO) | 8.5 | Burnt lime (dolomite) | 128 |
| $Al_2O_3$ | 1.5 | Feldspar | 100 |
| | | Saltcake | 5 |

A part (0.3%) of the alumina is assumed to be derived from the impurities in the sand and lime, and from the tank blocks. The remainder (1.2%) is supplied by feldspar.

Batches for the same glass, using the mixtures already specified, are as follows:

|  | Using mixture A | Using mixture B | Using Pyrophyllite |
|---|---|---|---|
| Sand | 1,000 | 1,000 | 1,000 |
| Soda ash | 407 | 414 | 421 |
| Burnt lime | 128 | 128 | 128 |
| Mixture A | 91 | Mixture B 83 | Pyrophyllite 75 |
| Salt cake | 5 | 5 | 5 |

The batches are calculated to produce glass of identical composition. Hence the soda ash content is increased when more pyrophyllite is used to compensate for the lower alkali content of the pyrophyllite.

It is to be noted that less pyrophyllite is required than feldspar for the same alumina content. Hence less $Fe_2O_3$ is introduced into the batch. This is of importance in making some types of glass, such as crystal glass.

The above compositions are readily soluble in a glass batch and since the material can be produced at a lower cost than feldspar, based on the equivalent alumina content, it becomes a highly desirable product for the glass manufacturer to use in the batch.

While certain specific embodiments of the invention have been given for purposes of illustration, it is to be understood that various changes and modifications may be made therein as will be apparent to a person skilled in the art. The invention is only to be limited in accordance with the following claims when interpreted in view of the prior art.

The invention claimed is:

1. A glass batch ingredient comprising a mixture of pyrophyllite and feldspar.

2. A glass batch ingredient comprising a mixture of pyrophyllite and feldspar in amounts ranging from about one-third to two-thirds pyrophyllite and the remainder substantially feldspar.

3. A glass batch ingredient comprising a mixture of pyrophyllite and feldspar in proportions such that the mixture contains above about 19% of alumina.

4. A glass batch ingredient comprising a mixture of pyrophyllite and feldspar having about the following composition:

|  | Per cent |
|---|---|
| $SiO_2$ | 70.6–71.7 |
| $Al_2O_3$ | 19.2–21 |
| $Fe_2O_3$ | .1 |
| $CaO$ | .4– .6 |
| $K_2O$ | 2.8– 5.6 |
| $Na_2O$ | 1.3– 2.4 |

5. In the process of making glass the novel step which comprises introducing pyrophyllite and feldspar into a glass batch in proportions to produce the required alumina content.

6. In the process of making glass the novel step which comprises introducing pyrophyllite into a glass batch in proportions to produce the required alumina content.

CHARLES H. PEDDRICK, Jr.